United States Patent [19]

Torp, Jr. et al.

[11] Patent Number: 5,501,036
[45] Date of Patent: Mar. 26, 1996

[54] EVEN-COIL EDGING FOR CARTONLESS PACKAGING

[75] Inventors: Clyde A. Torp, Jr., Naperville; Michael R. Hall, Aurora; Paul R. Miessler, Addison; Michael R. Vogler, Aurora, all of Ill.

[73] Assignee: Suncast Corporation, Batavia, Ill.

[21] Appl. No.: 165,949

[22] Filed: Dec. 13, 1993

[51] Int. Cl.⁶ .................................................. A01G 1/00
[52] U.S. Cl. ................................. 47/33; 52/102; 404/7; 239/201; 239/276; 428/33; 405/36
[58] Field of Search ........................ 172/13; 428/192, 428/33; 239/200, 201, 202, 198, 276; 405/154, 36, 43, 176; 242/47.5, 167; 138/118, 120, 123, 125; 256/1; 414/922, 930, 27; 47/33; 404/6–8; 52/102

[56] References Cited

U.S. PATENT DOCUMENTS

| | | |
|---|---|---|
| 2,877,600 | 3/1959 | Slate . |
| 3,387,786 | 6/1968 | Rynberk ................................. 239/201 |
| 3,485,449 | 12/1969 | Wilson .................................. 239/201 |
| 3,679,531 | 7/1972 | Wienand et al. ........................ 428/33 |
| 4,281,473 | 8/1981 | Emalfarb et al. .................. 239/201 X |
| 4,824,019 | 4/1989 | Lew ...................................... 239/201 |
| 5,106,235 | 4/1992 | King ................................. 239/201 X |

FOREIGN PATENT DOCUMENTS 1422293  11/1965  France .................................. 239/200

Primary Examiner—Randolph A. Reese
Assistant Examiner—Christopher J. Novosad
Attorney, Agent, or Firm—McHale & Slavin

[57] ABSTRACT

The present invention is a lawn edging device adapted to be used adjacent borders of walks and plant beds wherein the anchoring portion of the device includes opposing blades that facilitates storage and shipping by eliminating the necessity of external packaging. The edging utilizes a conventional longitudinally extending upper body portion with a vertical anchoring barrier depending therefrom. The anchoring barrier is formed integral to the upper body portion and utilizes a projecting blade positioned on one side of the barrier and receptacle for receiving the blade on the second side of the barrier. When the edging device is wound into a coil, for purposes of shipping and storage, the projecting blade on the first side is inserted into the receiving section on the second side of the anchoring barrier. The blades operate to align the circular bead of the upper body portion into a similar plane so as to provide a coiling of uniform shape.

10 Claims, 2 Drawing Sheets

5,501,036

EVEN-COIL EDGING FOR CARTONLESS PACKAGING

FIELD OF THE INVENTION

This invention relates generally to lawn edging devices, and more particularly, to an edging device which eliminates the need for packaging typically used for storage and shipping of the edging device.

BACKGROUND INFORMATION

Lawn edging is well known for its ability to restrict the growth of grass, weeds or other vegetation growth. Edging devices are particularly adapted for use along walkways, gardens, and flower beds providing a clear line of demarcation between various growths. Properly installed, the edging eliminates the need for burdensome hand, electric, and gas powered cutting devices as well as the application of chemicals used to control growth.

The conventional lawn edging device is formed from extruded plastic in lengths that may exceed fifty feet. The edging typically includes the use of a vertical barrier that extends into the earth at least two inches to prevent the natural progression of root growth. Anchoring of the edging is made possible by the use of stakes or by the incorporation of protrusions along the length of the vertical barrier to engage the soil. A top portion of conventional lawn edging devices utilizes an enlarged section to prevent the barrier from being improperly inserted into the ground but more importantly, to prevent growth over the top of the barrier and to provide an aesthetically pleasing border line.

U.S. Pat. No. 3,387,786 discloses the use of stakes and various barbs placed upon the vertical barrier of the device for anchoring to the earth. This edging is typical of the prior art in that the anchoring portion of the edging is not uniform to the upper portion and thus requires special packaging to maintain the edging product in a fixed position for purposes of storage and shipping.

In all such cases, the common method of storing lawn edging is by rolling the product into a coil. If the vertical barrier is flat, the coiling of the device will provide an inequity between the upper portion and the vertical barrier so as to require specialized packing to prevent uncoiling. Simple banding of the edging does not provide for uniform stacking as one side of the coiled product lacks sufficient material for support and can lead to dangerous stacking conditions. In instances where an anchoring component is incorporated into the barrier, the anchor can cause a further inequity when the edging device is placed into a coiled state causing the edging to shift or otherwise remain unstable during storage and shipping. In instances where only banding straps are used, the poor support on one side of the edging product prevents safe stacking requiring extra care and material for both storage and shipping. Thus, current practice is to use a corrugated carton or the like sleeve to prevent uncoiling as well as provide the necessary support storage required for stacking purposes.

The problem with corrugated cartons for storing and shipping is that it adds to the manufacturing expense and, more importantly, places a burden on the environment both in material consumption and waste disposal. Further, corrugated cardboard packaging limits display of the edging product to covered locations since exposure to rain will ruin the package. If the packaging is solid, the consumer is unsure what the edging looks like requiring an expensive color print to be placed on the outside of the box or risk damage to the box by the curious consumer.

Thus, what is needed is an edging device that; can be coiled for purposes of storage and shipping without the use of cartons; provides a secure surface for stacking edging product in a horizontal position; and will stay in the earth once positioned.

SUMMARY OF THE INVENTION

The present invention is adapted to be used adjacent borders of walks and plant beds in the conventional manner providing an anchoring barrier that facilitates storage and shipping as well as provide increased ground securement. The device is constructed of extruded plastic having a longitudinally extending upper body portion with the vertical anchoring barrier depending therefrom. The body portion is characterized as a circular shape with a cross sectional diameter of about 1 inch. The body portion can be used to transfer water along the border for purposes of sprinkling. The anchoring barrier formed integral to the upper body portion utilizes a projecting blade positioned on one side of the barrier and a receiving section formed from two blades positioned on the second side of the barrier.

After manufacturing, the lawn edging device is wound into a coil wherein the projecting blade is inserted into the receiving section. The blades operate to position the circular body of the upper body portion into a similar plane or even-coil so as to provide a coiled package of uniform shape. Once the lawn edging device is wound into a coil shape, the coiling is maintained by use of a single binding strip positioned near the end of the coil. The interlocking of the coiled edging provides a secure surface for horizontal stacking.

Accordingly, a primary objective of the instant invention is to provide a lawn edging product securable in a coiled position without the need for external packaging so as to lower the cost of manufacture as well as eliminate consumer waste by providing a package-less container.

Still another objective of the instant invention is to provide a lawn edging product that provides sufficient rigidity when placed into a coiled position for purposes of storage and shipping.

Yet still another objective of the instant invention is to provide a means for alignment that further provides a biased anchor without the need for connectors or stakes.

Yet another objective of the instant invention is to provide a grass edging device that provides coil rigidity to facilitate bundling, strapping, and stacking.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Figure 1:
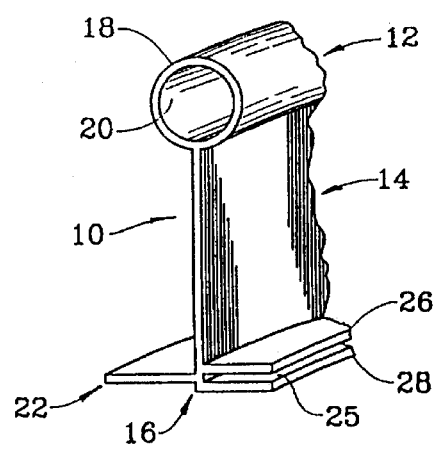
FIG. 1 is a perspective view of a portion of the edging device.
Figure 2:
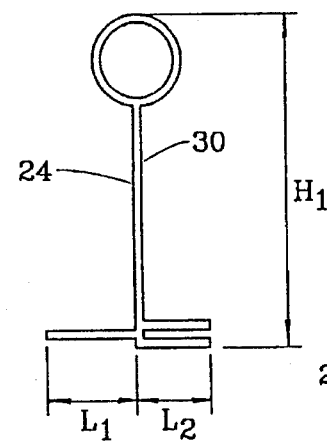
FIG. 2 is an end view of the edging device.

Now referring in general to FIGS. 1 and 2, the grass edging device 10 of instant invention is constructed from a single piece of flexible extruded thermoplastic. The edging device 10 is defined by an upper portion 12, a vertical barrier 14, and an anchoring portion 16. The upper portion 12 has a circular transverse cross section 18 along the longitudinal length of the edging 10 with a bore 20 providing an enlarged barrier of minimal material and further creating a path available for communicating water along the length thereof if the device is to be used as part of a sprinkling device.

An outwardly extending blade 22 is disposed on a first side 24 of the vertical barrier 14 extending $L_1$ outwardly approximately one inch. Operatively associated with blade 22, while in a stored position, is a receptacle 25 formed by upper blade 26 and lower blade 28 both of which extend $L_2$ outwardly approximately three fourths of an inch from second side 30 of the vertical barrier 14. Blade 22 is centrally placed and disposed opposite the receptacle portion 25 so as to allow alignment of the blade 22 into the receptacle 25 when the edging device 10 is placed into a coiled position. The height $H_1$ of the edging device is dependant upon consumer preference with a preferred height of greater than one and one half inches so as to provide sufficient depth to prevent root transfer past the barrier.

Figure 3:
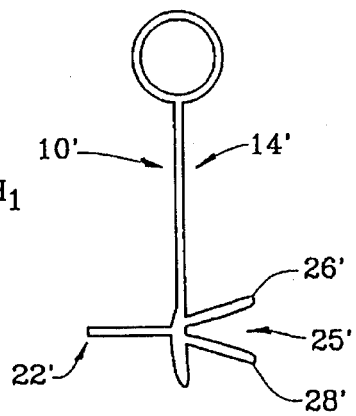
FIG. 3 is an end view of an alternative embodiment of the edging device.

FIG. 3 sets forth an alternative embodiment of the edging device 10' wherein the upper blade 26' and lower blade 28' extend outwardly from the vertical barrier 14' providing a V-shaped receptacle 25' for receipt of alignment blade 22'. The V-shaped receptacle 25' further decreases manufacturing time by enlarging the receptacle 25' without defeating the purpose of the invention. The opposing blades shown on each embodiment provide uniform anchoring of the device into the earth. For instance, edging devices that use a single barb on one side of vertical barrier will cause the edging device to twist toward one side if the soil becomes soft due to excess moisture from rain or watering. Conversely, the use of opposing blades provides the added benefit of providing equal anchoring support on each side of the barrier so as to lessen the twisting effect. Proper anchoring allows the edging device to be arranged around corners and in various patterns.

Figure 4:
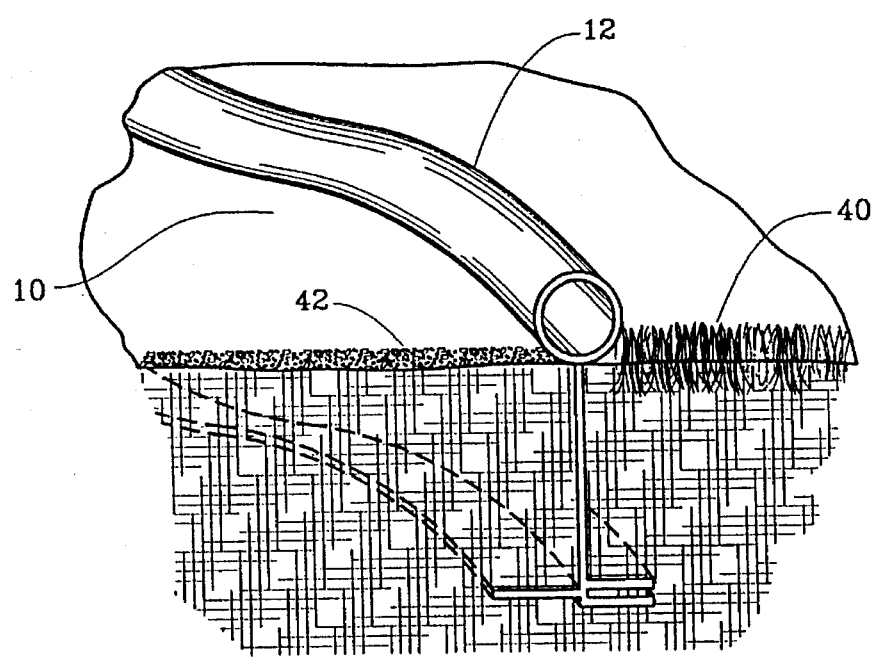
FIG. 4 is a pictorial view of edging device placed into the earth.

Now referring to FIG. 4, a pictorial view of the edging device 10 is depicted wherein the vertical barrier 14 separates a grass area 40 from a gravel area 42. Placement into the earth requires the formation of a small crevice with soil used for back filling. The upper portion 12 of the edging device extends above the level of the soil so as to provide an aesthetically pleasing border as well as prevent growth over the top of the vertical barrier 14. The vertical barrier 14 is of sufficient height so as to prevent vegetonic root passage. The blades 22, 26, and 28 now maintain the edging device 10 in secure position by anchoring to the earth. As previously mentioned, the opposing blades prevent the placement of twisting pressures on the vertical barrier thus allowing the upper portion 12 to maintain proper positioning despite the soil texture. The upper surfaces of the blades, once covered with backfill, provides a large surface area to prevent lifting of the edging device after positioning. The blades depicted are shown of indefinite length, however, it should be noted that the blades can extend along just a portion of the vertical barrier. Stakes can be used without defeating the primary purpose of this invention in providing a cartonless coiling for shipping and storage.

Figure 5:
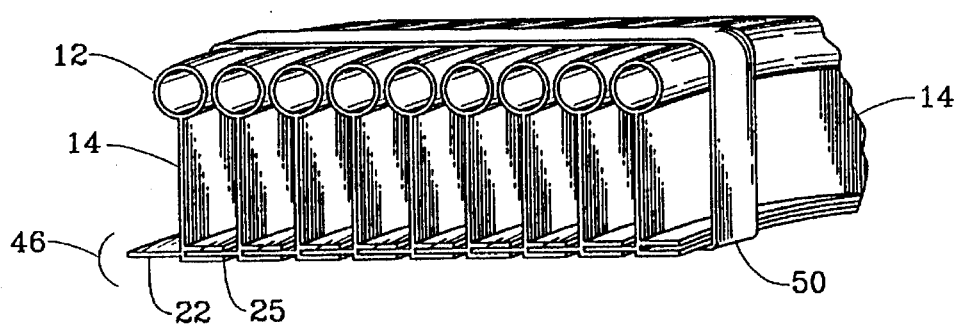
FIG. 5 is a cross-sectional end view of coiled edging.

FIG. 5 sets forth a cross-sectional end view of the edging device 10 while in a coiled position. The edging device 10 is shown coiled by placement of the insertion blade 22 into the receptacle portion 25 formed by blades 26 and 28 creating an interlocked foundation 46. The insertion blade 22 centers the vertical barrier causing the juxtapositioning of the upper portion 12 during coiling so as to provide uniform storage in a parallel plane. Adhesive tape 50 or the like banding strap maintains the insertion blade 22 in the receptacle 25 so as to maintain coil rigidity during shipping and storage. It should be noted that $L_1$ and $L_2$ can be of other lengths with the objective being to match the diameter of the upper portion 12 so that upon coiling the upper and lower portions are in uniform and parallel planes.

Figure 6:
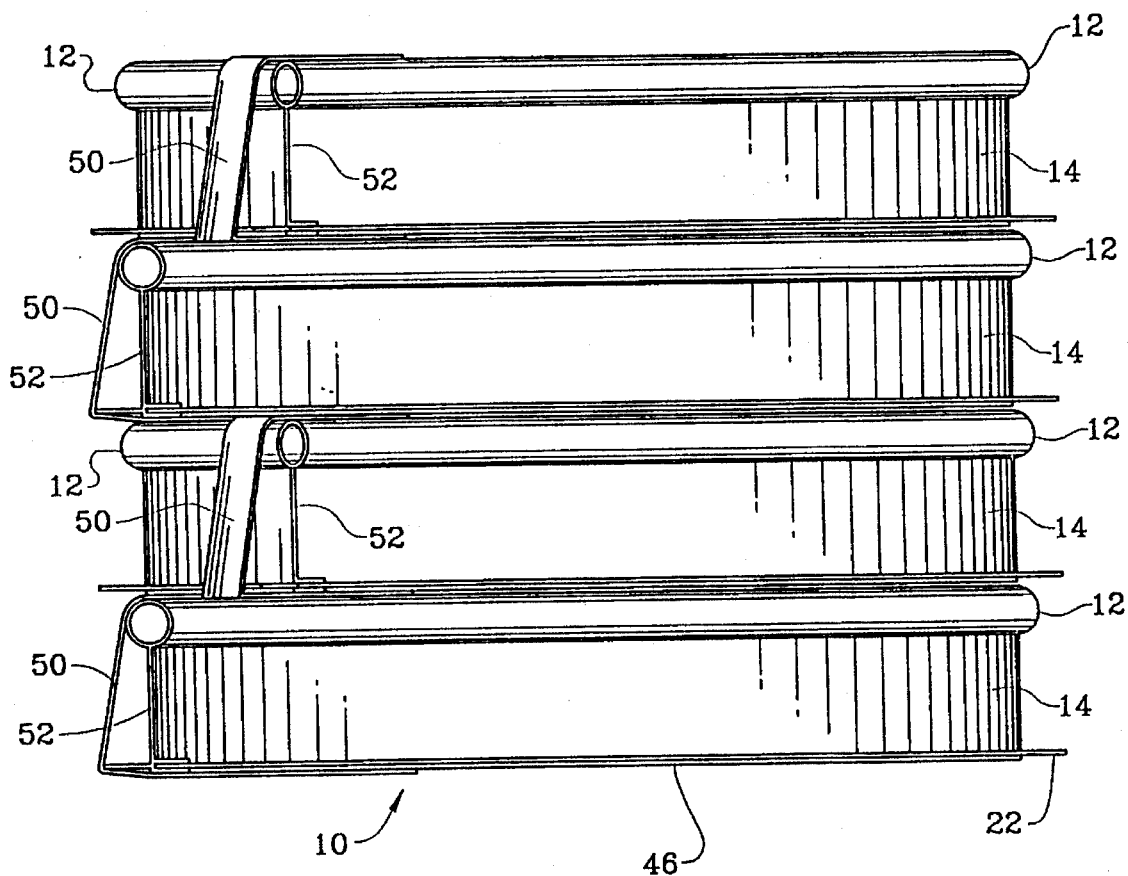
FIG. 6 is a perspective view of multiple coiled edging devices stored in a stacked position.

FIG. 6 illustrates the stackability of the coiled edging devices 10 without the need for additional packaging. The foundation 46 prevents movement of the vertical barrier so as to maintain the upper portion 12 in a single plane. The banding strap 50 is placed near the end 52 of the edging device 10 so as to prevent uncoiling. The rigidity allows for ease of carrying the edging device 10 and storage in the uniform stacked position as shown. Advertisement can be affixed to the outer surface of the vertical barrier 14 providing pricing, inventory control, and other necessary items without defeating the ability of the cartonless packaging to be stored or displayed outside.

It is to be understood that while we have illustrated and described certain forms of our invention, it is not to be limited to the specific forms or arrangement herein described and shown. It will be apparent to those skilled in the art that various changes may be made without departing from the scope of the invention and the invention is not to be considered limited to what is shown in the drawings and described in the specification.

What we claim is:

1. A grass edging device that is stored without external packaging and adapted for use adjacent borders of walks and plant beds comprising:

a length of flexible plastic material having a longitudinally extending upper body portion and a vertical barrier of nominal thickness depending therefrom, said vertical barrier having a blade extending perpendicular to a side surface of said barrier along a bottom portion thereof and a receptacle means disposed on an opposite side surface of said barrier for use when said device is placed into a coiled position whereby said grass edging device is stored without external packaging by securing said blade to said receptacle means, said blade and receptacle means available for anchoring said device to the earth in an uncoiled position.

2. The grass edging device according to claim 1 wherein said body portion is defined as a circular transverse cross section.

3. The grass edging device according to claim 2 wherein said circular cross section includes an enlarged longitudinally extending bore available for communicating water along the length thereof.

4. The grass edging device according to claim 1 wherein said blade disposed on said side of said barrier extends outwardly from said side along at least a portion of the longitudinal length of said barrier.

5. The grass edging device according to claim 1 wherein said blade extends outwardly from said side surface approximately one inch.

6. The grass edging device according to claim 1 wherein said receptacle means is further defined as two spaced apart parallely disposed blades extending outwardly from said opposite side along at least a portion of the longitudinal length of said barrier.

7. A grass edging device according to claim 6 wherein said blade is about 0.75 inches in length.

8. The grass edging device according to claim 1 wherein said receptacle means is further characterized as an anchor maintaining said upper body portion in a fixed position upon placement into the earth.

9. A grass edging device that is stored without external packaging and adapted for use adjacent borders of walks and plant beds comprising: a length of flexible extruded thermoplastic having a longitudinally extending body portion defining a circular transverse cross section along an upper portion thereof and a vertical barrier depending therefrom with a first outwardly extending blade disposed on a first side of said barrier and a second and third spaced apart outwardly extending blade disposed on a second side of said barrier, whereby said device is stored in a coiled position by placement of said first outwardly extending blade in between said second and third blades on said second side for use in maintaining said barrier in a common plane while in a coiled position wherein said blades are available for anchoring said barrier to the earth when said device is uncoiled.

10. A grass edging device according to claim 9 wherein each said blade is about 0.75 inches in length.

\* \* \* \* \*